Jan. 29, 1924. 1,482,325
W. E. SHIVELY
APPARATUS AND METHOD FOR MOLDING TREAD BANDS
Filed Aug. 26, 1920   3 Sheets-Sheet 2

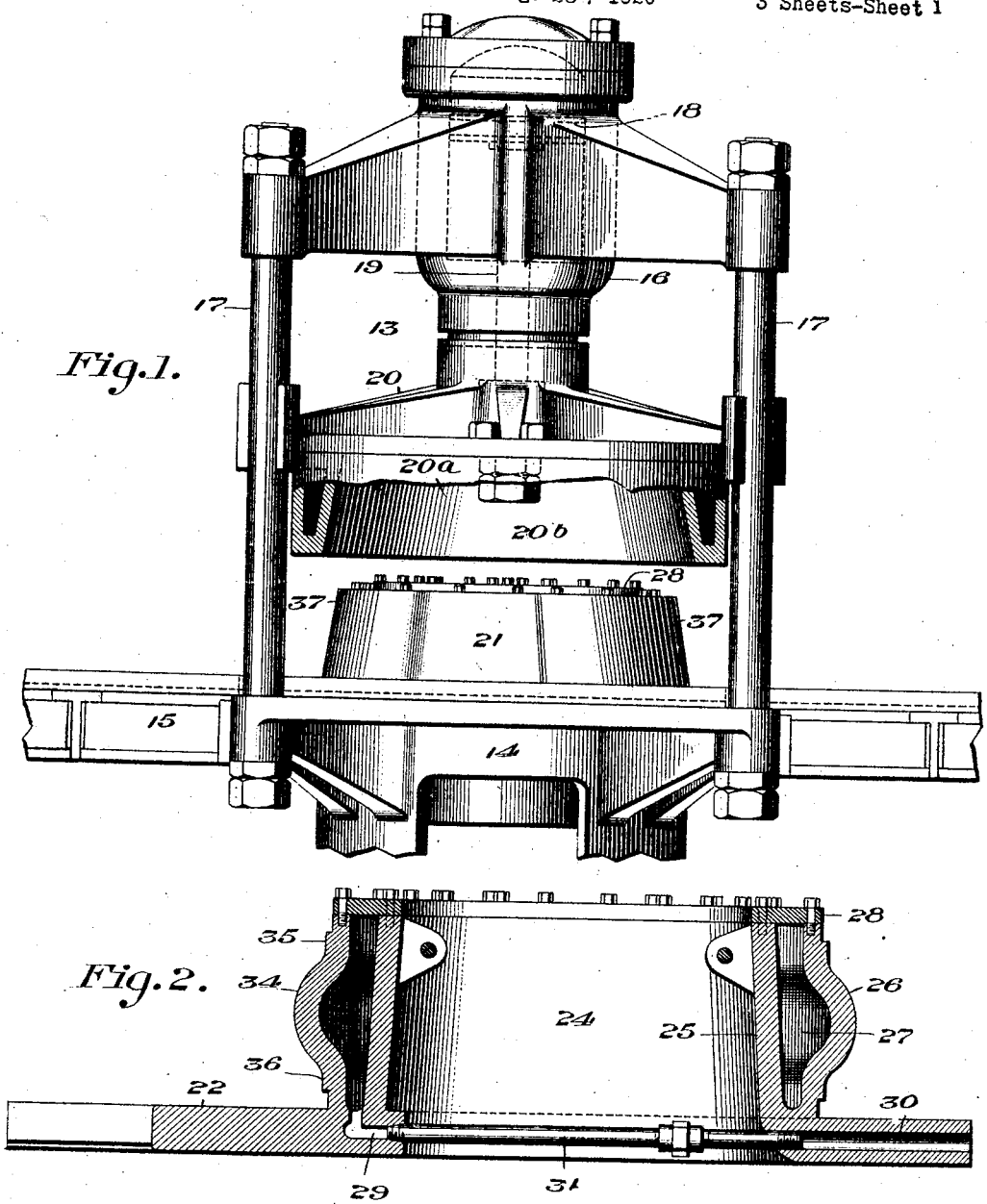

Inventor
Walter E. Shively

Jan. 29, 1924.
W. E. SHIVELY
1,482,325
APPARATUS AND METHOD FOR MOLDING TREAD BANDS
Filed Aug. 26, 1920     3 Sheets-Sheet 3
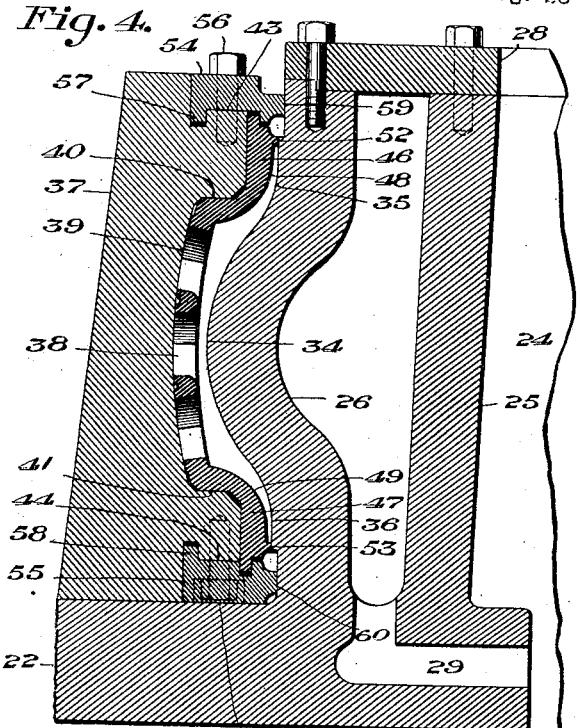
Fig. 4.
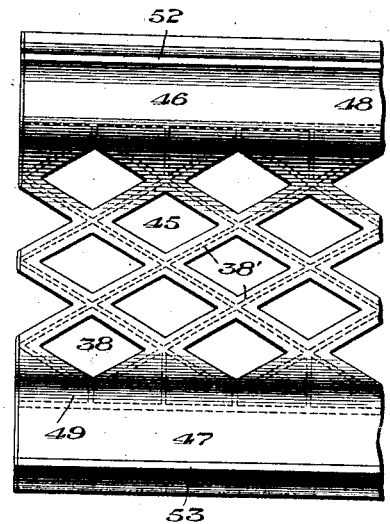
Fig. 6.
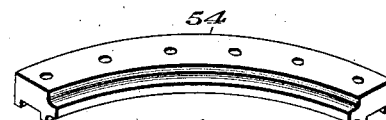
Fig. 9.
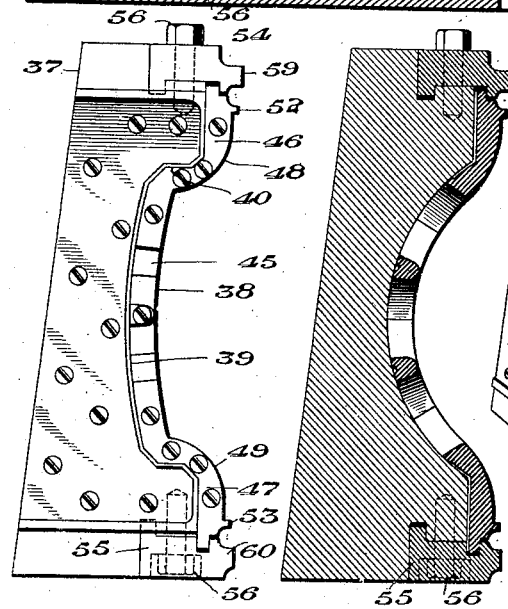
Fig. 5.    Fig. 7.
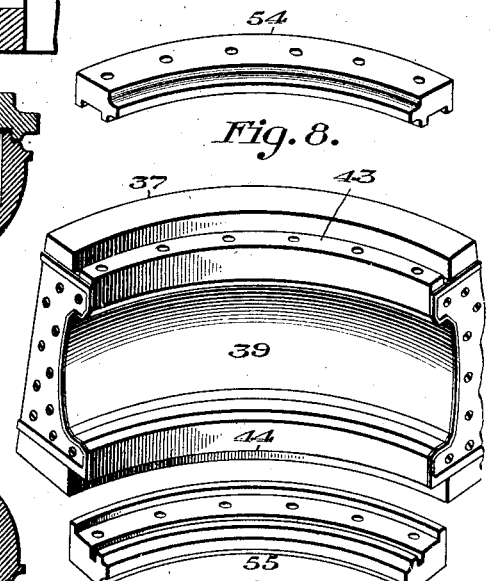
Fig. 8.
Fig. 10.
Inventor
Walter E. Shively Patented Jan. 29, 1924.

1,482,325

UNITED STATES PATENT OFFICE.

WALTER E. SHIVELY, OF AKRON, OHIO, ASSIGNOR TO THE GOODYEAR TIRE & RUBBER COMPANY, OF AKRON, OHIO, A CORPORATION OF OHIO.

APPARATUS AND METHOD FOR MOLDING TREAD BANDS.

Application filed August 26, 1920. Serial No. 406,256.

*To all whom it may concern:*

Be it known that I, WALTER E. SHIVELY, a citizen of the United States, and resident of Akron, Ohio, have invented new and useful Improvements in Apparatus and Methods for Molding Tread Bands, of which the following is a specification.

The present invention relates to the art of molding, and more specifically to improvements in a mold for curing and shaping tire tread bands of the non-skid variety; to the article produced through the use of the mold; and to the method of forming the article.

In the tire manufacturing art, so far as I am aware, the only type of non-skid tread band which has been molded and semi-cured upon a circular mold, with any degree of success, is the flat band; that is to say the band which before it is applied to the tire carcass is not curved in the direction of its cross-section. The most commonly used type of mold, for curing these bands and delineating the non-skid pattern thereon, includes a heated drum having a flat periphery into which the non-skid pattern is engraved, and segmental sections which are adapted to form an enclosing ring about the drum when they are moved toward the same in their proper relation. The segmental sections are usually concave on their inner faces to provide an increased thickness at the center of the tread band. Obviously, the band molded in this manner has the non-skid pattern formed upon its inner periphery and must be turned inside out before it can be applied to a tire carcass, which operation distorts the projections or configurations of the non-skid portion and stresses or stretches the outer periphery of the band while the intermediate portion thereof, at the base of the non-skid projections, is compressed and cramped and the life of the band is consequently shortened. Moreover, in curving the band in conformity with the transverse curve of the tire, when it is applied, this stretching or stressing of the outer periphery of the tread surface is increased to a destructive degree and the inner periphery of the band develops bunches or wrinkles causing the formation of air pockets between the base of the band and the periphery of the tire carcass, which air pockets extend both transversely of the tire and longitudinally thereof and are one of the primary causes of what is known as tread separation.

It is the primary object of this invention to provide a mold through the use of which tread bands having non-skid tread portions may be partly or semi-cured and shaped from a single band into their ultimate cross-sectional contour with their inner face portions exactly conforming to the transverse curve of the carcass upon which they are to be applied, thereby eliminating air pockets between the band and the carcass, and obviating the detrimental distortion of the article during its application to the carcass.

It is a further object of this invention to provide a molded tread band, the outer periphery of which is relatively flat transversely to increase its ground gripping area, and to so fashion the band to substantially reinforce and augment its carrying capacity as to materially increase its longevity under the weight of a heavy load.

Other objects and advantages will become apparent when the following specification is read in conjunction with the accompanying drawings in which:

Figure 1 is a side elevation with parts shown in section illustrating a preferred type of my improved mold positioned upon a well known type of hydraulic press.

Figure 2 is a longitudinal vertical section on an enlarged scale, showing the mold slide and drum.

Figure 4 is a fragmentary sectional view on a still further enlarged scale, taken on the line 4—4 of Figure 3.

Figure 5, is an end elevational view of one of the segmental matrix sections.

Figure 6, is a fragmentary elevational view of a portion of one of the matrix plates.

Figure 7 is a transverse section showing a modified form of matrix plate and segmental section.

Figure 8 is a perspective view of one of the segmental sections.

Figures 9 and 10 are perspective views of the segments for attaching the matrix plates upon their respective segmental sections.

Figure 3:
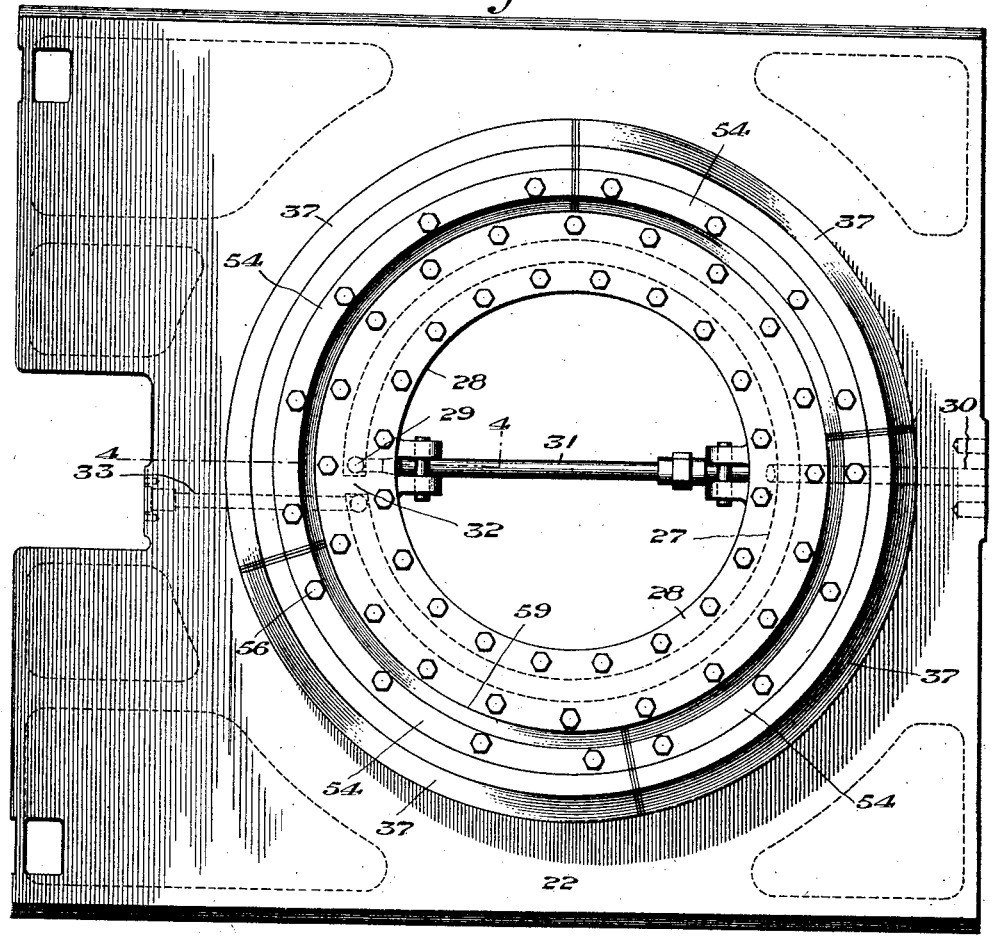
Figure 3 is a top plan view of the assembled mold.

Referring to the drawings by numeral, 13 designates an hydraulic press of a type peculiarly adapted for operation in conjunction with my present mold device and which, while it forms no particular part of the present invention, serves to illustrate the practical application thereof. This form of press embodies a column 14 supporting a table 15, a pressure cylinder 16 supported above the column, and concentrically thereof, by guide rods 17, and a piston 18 and rod 19 designed to receiprocate a presser head 20 upon the rods 17.

The mold device proper is designated by the numeral 21, and comprises component devices hereinafter described in detail, all of which are carried upon a supporting slide member 22, clearly illustrated in Figure 3 of the drawings. Preferably a plurality of these molds are associated with each press and their respective slide members are coupled together to form a train or unit which is mounted for sliding movement upon the table 15 to position the molds successively beneath the presser head 20. Inasmuch as the mechanism for accomplishing this operation forms no part of the present invention its illustration has been omitted from the drawings.

The mold in its preferred form embodies an annular drum 24 formed with an inner wall 25 and an outer wall 26 which walls are vertically disposed and spaced from each other to form therebetween a chamber 27 which is closed by an annular ring 28. Preferably this drum, as shown, is formed integral with the slide, which is provided with aligned inlet ducts 29 and 30 at opposite sides of the drum. The duct 29 communicates with the chamber 27 and is connected to the duct 30 by a pipe as shown at 31. A suitable system of piping (not shown) may be utilized to connect the duct 30 with a source of heat supply such as steam or hot water. A baffle plate or wall 32 is provided within the chamber 27 between the inlet duct 29 and an exhaust port 33 leading from the chamber as shown in dotted lines in Figure 3. By means of this arrangement of ducts and the baffle plate 31, the steam or other heating medium is forced completely around the chamber 27 before it reaches the exhaust port 33 from which it may be led, if desired, by pipe connections, not shown, to the inlet duct of the adjacent mold as will be clearly understood without further description. As clearly illustrated in Figures 2 and 4 of the drawings, the outer wall 26 of the drum is formed with a projecting portion which provides an annular male die member 34 for shaping the inner face of the tread band and which extends around the medial line of the drum. The outer peripheral surface of the die member 34 is curved transversely in the arc of a circle which merges, by reverse curves, into the vertical surfaces 35 and 36 terminating respectively short of the top and bottom of the wall.

A plurality of segmental sections 37 are provided for use in conjunction with the drum 26, which sections are designed when properly mated, by means hereinafter described to form an annulus of frusto-conical design adapted to completely surround the drum and to enclose the male die member 34. Each section carries a matrix plate 38 for forming the outer peripheral portion of the tread band, the plates being removable from the sections as will presently appear. Each section has its inner portion chambered along its medial line to provide an inner wall 39 which is slightly curved transversely of the segment, and which terminates adjacent the top and bottom of the segment in the lateral shoulders 40 and 41 respectively. The inner wall 42 of each section adjacent the shoulders 40 and 41 is substantially vertical and terminates in the laterally disposed seats 43, 44 at the top and bottom respectively of the segment.

The matrix plates 38 are provided with a tread delineating portion 45, the outer surface of which fits snugly against the wall 39 of the section, this portion of the plate being securely held to the section between the lateral shoulders 40 and 41 of the section. The non-skid tread portion is formed in this plate preferably as shown in Figures 4 and 6 although it may be engraved therein or embossed if desired. Each plate 38 is provided with vertical portions 46 and 47 which are offset from the portion 45 as shown and which are designed to fit snugly against the inner vertical wall of the section. If desired the plates 38 may be grooved on their back faces as shown by the dotted lines at 38', see Figure 6, to provide for the escape of the entrapped air during the molding operation, although I have found that the air escapes freely from between the matrix plates 38 and the sections 37 without the aid of these grooves.

The inner walls of the portions 46 and 47 are curved as shown at 48 and 49 in order to form, in conjunction with vertical surfaces 35 and 36 upon the drum, a flap 50 at each edge of the tread band as shown in Figure 10. Preferably these curved surfaces 48 and 49 are so disposed with relation to the edges of the tread forming portion of the matrix of the plates as to form shouldered portions 51 at each edge of the tread band, and each surface at its extreme outer edge terminates in a lateral bead designated 52 and 53 respectively which, when the mold is assembled, contact respectively with the vertical surfaces 35 and 36 as clearly shown in Figure 4.

Suitable retaining means are provided for holding each matrix plate 38 to its section, such as the retaining ring segments 54 and 55 which are adapted to engage the lateral shoulders 43 and 44 respectively and are held to the sections by the bolts 56. Each of these retaining sections is constructed to fit snugly over one edge of its associated matrix plate and is retained against lateral movement with respect to its section by the tongue and groove arrangements as at 57 and 58. The inner edge of each retaining ring as shown at 59 and 60 engages with the drum 24 whereby the edges of the matrix plates 38 are relieved of undue strain during the molding operation.

As a means of assembling the segmental sections 37 and forcing them against the drum 24 to accomplish the molding operation, I have elected to employ the type of heated presser head 20 previously referred to which is provided with an inner wall 20$^a$ constructed to form a frusto-conical recess 20$^b$.

In curing tread bands by the use of this mold apparatus, a band of rubber or rubber compound is first placed around the drum 24, and the segmental sections are manually positioned about the band. Hot water or steam is then admitted to the chamber 27, or this may be done previously if desired. The slide 22 is now moved to position the mold beneath the head 20 and the piston may be actuated by any well known pressure means to force the head 20 down about the segments 26. The control mechanism for admitting the presser medium to the cylinder 16 has not been shown as it forms no part of the present invention. Owing to the inclination of the outer walls of the segments 26 and the shape of the cooperating walls of the cavity 20$^a$ the segments will obviously be forced inwardly toward the drum 24 until the inner edges of the retaining segments 54 and 55 engage the drum 24 and the lateral shoulders 52 and 53 engage the vertical walls 35 and 36.

Figure 12:
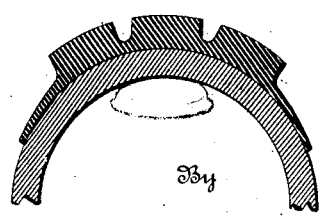

It will be observed that the matrix plates are removable and that other plates of a different pattern may be therefore substituted if desired, furthermore, other sections carrying plates of a different curvature may be used such, for instance, as that illustrated in Figure 7, when it is desired to produce a tread band of the type shown in Figure 12.

It is to be noted that the partly cured tread band which is molded in my preferred form of mold has a substantially flat ground engaging surface and that the inner carcass engaging face thereof throughout substantially the width of the tread band proper is molded and cured to the exact curvature of the tread face of a tire carcass.

Figure 11:
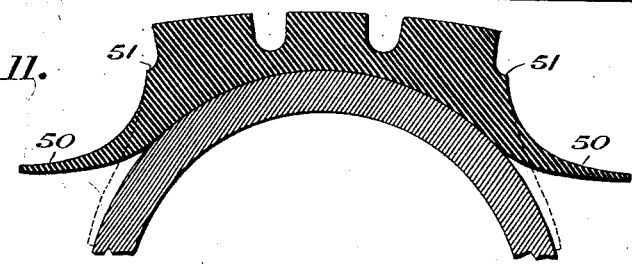
Figure 11 is an enlarged transverse sectional view illustrating the band as it appears after being molded in my preferred form of mold, and showing its application to a portion of a tire carcass, and, Figure 12, is an enlarged transverse section of the tread band produced by the modified form of the segmental sections illustrated in Figure 7, and showing it applied to a portion of a tire carcass.

It will also be noted that the band gradually increases in thickness from its medial line to the edges of the tread surface proper, whereby it is substantially reinforced and strengthened. In order to further strengthen the band adjacent the edges of the tread surface I provide the annular shoulders 51 from which points the side flaps 50 gradually taper to the side walls of the carcass, when the tread is applied as shown by the dotted lines in Figure 11.

While I have described and illustrated a preferred embodiment of my invention and one logical modification thereof it is to be understood that various changes in structure and arrangement of parts may be resorted to without departing from the spirit of the invention or the scope of the appended claims.

What I claim is:

1. A mold for tire treads comprising inner and outer concentric annular mold members one of which comprises segmental sections movable relatively to the other member, and means for moving the members to active position, the members being recessed whereby in active position they provide an annular mold chamber including a medial portion having a transversely curved inner wall and a relatively transversely flat outer wall and relatively thin laterally extending marginal portions.

2. A tread band mold comprising annular male and female die members one of which is formed of mating sections, the male member having an outer peripheral portion conforming in contour to the tread surface of a tire carcass and the female member having its inner peripheral face provided with a matrix portion for forming the tread face of the band, and a presser head operable for assembling the sectional member and pressing the sections into peripheral contact with the other member.

3. The combination with a vulcanizing press, of a mold for tire tread bands comprising an annular male die member having a projecting portion conforming in contour to the tread surface of a tire carcass, a female matrix member provided with a countersunk inner face portion and adapted to encircle the male member, one of said members being comprised of segmental mating sections, and a press actuated head operable for mating the segments of the sectional member and pressing them into peripheral contact with the other member.

4. The combination with a vulcanizing press including a supporting base, of a tread band mold comprising a drum having a peripheral male die portion conforming in contour to the tread surface of a tire carcass, a female mold member constructed to encircle the drum and comprising segmental matrix sections having chambered inner faces for receiving the male die member, and a presser head operable for mating the matrix sections and moving them toward the drum.

5. The combination with a vulcanizing press including a supporting base, of a tire tread band mold mounted upon the base and comprising a drum having a peripheral male die portion conforming in contour to the tread surface of a tire carcass, a female mold member constructed to encircle the drum and comprising segmental mating sections, a tread delineating matrix plate mounted upon the inner face of each section and provided with a slightly concave tread molding portion, and a presser head operable for mating the segmental sections and moving them toward the drum.

6. The combination with a vulcanizing press including a supporting base, of a tire tread band mold mounted upon the base and comprising a drum having a peripheral male die portion conforming in contour to the tread surface of a tire carcass, a female mold member constructed to encircle the drum and comprising segmental mating sections, a tread delineating matrix plate mounted upon the inner face of each section and formed with a slightly concave tread molding portion, means for retaining each matrix plate upon its respective section, and a presser head operable for mating the segmental sections and moving them toward the drum.

7. A tire tread band mold comprising a drum having its outer periphery constructed to form a male die member curved in conformity with the tread surface of a tire carcass, a female die member comprising a mold ring constructed to encircle the drum and comprising segmental sections each of which is provided with a slightly concave matrix face for delineating the tread surface of the band and curvilinear surfaces for forming in conjunction with the drum a shoulder and flap at each edge of the band, and a presser head for enclosing the segmental ring sections and forcing them into contact with the drum.

8. A tire tread band mold comprising a chambered drum having its outer periphery constructed to form a male die member curved in conformity with the tread surface of a tire carcass, an annular encircling female element of frusto-conical design comprising segmental sections each of which is provided with a slightly concave matrix face for delineating the tread face of the band and curvilinear surfaces for forming in conjunction with the drum a shoulder and flap at the edge of the band, means upon each section adapted to engage the drum to space the surfaces therefrom, and a heated presser head formed with a frusto-conical chamber for enclosing the sections and forcing them into contact with the drum.

9. A tire tread band mold comprising a heated drum having its outer periphery constructed to form a male die member curved in conformity with the tread surface of a tire carcass, an annular encircling female element of frusto-conical design comprising segmental sections having chambered inner faces, a matrix plate for each section having a relatively straight tread forming portion and curvilinear surfaces for forming in conjunction with the drum a shoulder and flap at each edge of the band, means upon each plate for spacing said plates from the drum, and a heated presser head for enclosing the sections and forcing them toward the drum.

10. A tire tread band mold comprising a heated drum having its outer periphery constructed to form a male die member curved in conformity with the tread surface of a tire carcass, an annular encircling female element of frusto-conical design comprising segmental sections having chambered inner faces, a matrix plate for each section having a relatively straight tread forming portion and curvilinear surfaces for forming in conjunction with the drum a shoulder and flap at the edge of the band, means upon each plate for spacing said plates from the drum, means for retaining the plates upon their respective sections, and a presser head for enclosing the sections and forcing them toward the drum.

11. A tire tread band mold comprising a drum having its outer periphery constructed to form a male die member curved in conformity with the tread surface of a tire carcass, an annular encircling female element of frusto-conical design comprising segmental sections having chambered inner faces, a matrix plate upon each section having a relatively straight tread forming portion and curvilinear surfaces for forming in conjunction with the drum a shoulder and flap at the edge of the band, means upon each plate for spacing said plate from the drum, means for retaining each plate upon its respective section, and a presser head having an inclined inner wall for enclosing the sections and forcing them toward the drum.

12. The method of molding tire tread bands which consists in semi-vulcanizing an annulus of rubber composition and simultaneously forming said annulus along its median portion into its ultimate cross sectional contour.

13. The method of molding tire tread bands which consists in simultaneously shaping the inner periphery of an annulus of rubber composition in conformity with the tread surface of a tire carcass and forming its outer periphery with a traction surface which is relatively flat transversely while the annulus is being subjected to the action of heat.

14. The method of molding tire tread bands which consists in simultaneously shaping the inner periphery of an annulus of rubber composition in conformity with the tread surface of a tire carcass and forming its outer periphery with a non-skid tread portion which is relatively flat transversely while the annulus is being subjected to the action of heat.

15. The method of molding tire tread bands which consists in simultaneously shaping the inner periphery of an annulus of rubber composition in conformity with the tread surface of a tire carcass and forming its outer periphery with a transversely relatively flat shouldered tread portion while the annulus is being subjected to the action of heat.

16. The method of molding tire tread bands which consists in simultaneously shaping the inner periphery of an annulus of rubber composition in conformity with the tread surface of a tire carcass and forming its outer periphery with edge shoulders and a transversely relatively flat non-skid tread portion while the annulus is being subjected to the action of heat.

In witness whereof, I have hereunto signed my name in the presence of two subscribing witnesses.

April 23, 1920.

WALTER E. SHIVELY.

Witnesses:
L. M. HARTMAN,
J. E. KEATING.